(12) United States Patent
Cui et al.

(10) Patent No.: US 10,375,744 B2
(45) Date of Patent: Aug. 6, 2019

(54) SESSION CONTINUITY BETWEEN SOFTWARE-DEFINED NETWORK-CONTROLLED AND NON-SOFTWARE-DEFINED NETWORK-CONTROLLED WIRELESS NETWORKS

(71) Applicant: AT&T Intellectual Property I, L.P., Atlanta, GA (US)

(72) Inventors: Zhi Cui, Sugar Hill, GA (US); Paul Edward Smith, Jr., Rockwall, TX (US); Sangar Dowlatkhah, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/370,936

(22) Filed: Dec. 6, 2016

(65) Prior Publication Data

US 2018/0160354 A1    Jun. 7, 2018

(51) Int. Cl.
*H04W 36/00* (2009.01)
*H04W 76/12* (2018.01)
*H04W 36/14* (2009.01)

(52) U.S. Cl.
CPC ....... *H04W 76/12* (2018.02); *H04W 36/0033* (2013.01); *H04W 36/14* (2013.01)

(58) Field of Classification Search
CPC .......... H04W 36/18; H04W 36/0022; H04W 36/0033; H04W 36/14; H04W 36/385; H04W 76/022; H04W 36/08; H04W 36/12; H04W 36/30; H04W 36/0083; H04W 36/32; H04W 52/40
(Continued)

(56) References Cited

U.S. PATENT DOCUMENTS 8,144,593 B2   3/2012   Narayanan et al.
9,210,620 B2   12/2015   Murai et al.
(Continued)

OTHER PUBLICATIONS

Kim et al., "A SDN-based distributed mobility management in LTE/EPC network," The Journal of Supercomputing, Apr. 27, 2016, Springer Science+Business Media New York.
(Continued)

*Primary Examiner* — Khoi H Tran
*Assistant Examiner* — B M M Hannan
(74) *Attorney, Agent, or Firm* — Hartman & Citrin LLC

(57) ABSTRACT

Concepts and technologies disclosed herein are directed to session continuity between software-defined network ("SDN") controlled and non-SDN controlled wireless networks. In one embodiment, an SDN controller can determine that a handover of a user equipment ("UE") from a base station operating under control of the SDN-controlled network to a further base station operating under control of a non-SDN-controlled network has occurred. The SDN controller can establish over an interface between the SDN controller and a packet gateway ("P-GW"), a tunnel through which to exchange handover data associated with the handover and a session IP address for a session in which the UE is involved. The SDN controller can provide, over the interface and through the tunnel, the handover data and the session IP address to the P-GW.

20 Claims, 11 Drawing Sheets

(58) Field of Classification Search
USPC .................................................. 455/436–439
See application file for complete search history.

(56) References Cited

U.S. PATENT DOCUMENTS

| | | |
|---|---|---|
| 2003/0224792 A1 | 12/2003 | Verma et al. |
| 2011/0216743 A1* | 9/2011 | Bachmann ............ H04L 63/164 |
| | | 370/331 |
| 2011/0219105 A1 | 9/2011 | Kryze et al. |
| 2014/0153544 A1* | 6/2014 | Lu ........................... H04W 8/26 |
| | | 370/331 |
| 2015/0201453 A1* | 7/2015 | Roeland .............. H04W 76/026 |
| | | 370/328 |
| 2015/0245392 A1 | 8/2015 | Chan et al. |
| 2015/0288388 A1 | 10/2015 | Kim et al. |
| 2015/0381741 A1 | 12/2015 | Dowlatkhah et al. |
| 2016/0095019 A1 | 3/2016 | Cui et al. |
| 2016/0127889 A1 | 5/2016 | Cui et al. |
| 2016/0127962 A1 | 5/2016 | Condeixa et al. |
| 2016/0150448 A1* | 5/2016 | Perras ................... H04W 36/12 |
| | | 455/450 |
| 2016/0277980 A1 | 9/2016 | Roeland et al. |
| 2017/0055183 A1* | 2/2017 | Park ................. H04W 36/0033 |
| 2017/0126618 A1* | 5/2017 | Bhaskaran .......... H04L 61/2007 |
| 2017/0230877 A1* | 8/2017 | Claassen ........... H04W 36/0016 |
| 2017/0290082 A1* | 10/2017 | Salkintzis ........... H04W 76/045 |
| 2017/0303169 A1* | 10/2017 | Hampel ............ H04W 36/0016 |

OTHER PUBLICATIONS

Karimzadeh et al., "Applying SDN/OpenFlow in Virtualized LTE to support Distributed Mobility Management (DMM)," 2014 Proceedings of the 4$^{th}$ International Conference on Cloud Computing and Services Science, Apr. 3-5, 2014, pp. 639-644.

Bradai et al., "Dynamic anchor points selection for mobility management in Software Defined Networks," Journal of Network and Computer Applications, vol. 57, Nov. 2015, Elsevier Ltd.

* cited by examiner

SESSION CONTINUITY BETWEEN SOFTWARE-DEFINED NETWORK-CONTROLLED AND NON-SOFTWARE-DEFINED NETWORK-CONTROLLED WIRELESS NETWORKS

BACKGROUND

Mobile network traffic has been growing at a very fast pace. In addition, the variation of network end points, the variation of applications, and the variation of mobility states of user equipment devices ("UE") (e.g., whether or not a UE is moving, and if so, how fast) are growing, and this trend will likely continue.

In the current state of the art, different radio technologies, such as WI-FI and cellular, utilize different management and control mechanisms, and the same is true even within Third Generation Partnership Project ("3GPP") cellular technologies. Current cellular mobility management treats all network end points as equal. This management approach works for existing device types, including, for example, smart devices such as smart phones, tablets, and the like.

The traditional approach of cellular mobility management that treats all network end points the same will no longer work cost effectively in the new paradigm where billions of Internet of Things ("IoT") and machine-to-machine ("M2M") end points exist and most of these devices never move. The evolution to 5G networks will embrace a mosaic of radio access technologies ("RATs"). For this reason, a better, simpler, and more cost-effective mobility management approach is needed that can also take into account the device type.

The session management procedures utilized in cellular networks today add significant and unnecessary complexity to the lower protocol layer stacks in both devices and networks, and also to the session concept between the device application layer and an Internet application at the upper protocol layers. In particular, additional data session connections between a device and a packet data network ("PDN") gateway ("P-GW") within a cellular network involve complex connection-oriented control procedures (e.g., 3GPP non-access stratum ("NAS") and general packet radio service ("GPRS") tunneling protocol ("GTP") control ("GTP-C") procedures and complex user plane tunneling protocols within the cellular network (e.g., GTP-U and/or generic routing encapsulation ("GRE") tunneling).

SUMMARY

Concepts and technologies disclosed herein are directed to session continuity between software-defined network ("SDN") controlled and non-SDN controlled wireless networks. The concepts and technologies disclosed herein leverage a connection-less native IP-based protocol to manage device mobility and session continuity within a type of radio access network ("RAN") and/or across different RAN technologies. This is possible due to SDN technology and thanks to collaboration between autonomous devices and networks. Future services, however, will need to be supported on many different types of networks that utilize different management control systems, including networks that do not support SDN. Accordingly, the concepts and technologies disclosed herein extend SDN-based management solution to support interworking with non-SDN based networks and roaming scenarios with session continuity.

According to one aspect of the concepts and technologies disclosed herein, a system includes a packet gateway ("P-GW") that operates in a non-SDN-controlled network and an SDN controller that operates in an SDN-controlled network. The SDN controller can determine that a handover of a user equipment ("UE") has occurred from a base station that operates under control of the SDN-controlled network to a further base station that operates under control of the non-SDN-controlled network. The SDN controller can establish, over an interface between the SDN controller operating in the SDN-controlled network and the P-GW operating in the non-SDN-controlled network, a tunnel through which to exchange handover data associated with the handover and a session IP address for a session in which the UE is involved. The SDN controller can provide, over the interface and through the tunnel, the handover data and the session IP address to the P-GW.

In some embodiments, the P-GW can receive a request from the UE for a new session IP address. In response, the P-GW can determine that no new session IP address will be assigned to the UE since the session IP address was received from the SDN controller over the interface via the tunnel. The P-GW can inform the UE that no new session IP address will be assigned to the user equipment so as to maintain session continuity in response to the handover. The P-GW can receive packets destined for the UE and can forward the packets to the UE. In some embodiments, the P-GW can forward the packets towards the UE based, at least in part, upon information maintained by an edge network component. In some embodiments, the P-GW can forward the packets towards the UE based, at least in part, on information maintained by the SDN controller.

In some embodiments, the P-GW can receive a request from the UE for a new session IP address. In response, the P-GW can determine that a new session IP address will be assigned to the UE since session continuity is not desired. The P-GW can assign the new session IP address to the UE.

In some embodiments, the system can include a WI-FI gateway, such as a trusted wireless local area network ("WLAN") access gateway/proxy ("TWAG/TWAP"). The WI-FI gateway can authenticate the UE using 3GPP authentication procedures. The WI-FI gateway can establish a further tunnel with the P-GW for the session. The WI-FI gateway can inform, via the further tunnel, the P-GW of the session.

In some embodiments, the P-GW can determine that the UE has been handed over from the further base station that operates under control of the non-SDN-controlled network to the base station that operates under control of the SDN-controlled network. The SDN controller can receive a request from the UE for a new session IP address. The SDN controller can determine that no new session IP address will be assigned since the UE was served by the P-GW.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter.

Furthermore, the claimed subject matter is not limited to implementations that solve any or all disadvantages noted in any part of this disclosure.

DETAILED DESCRIPTION

Concepts and technologies disclosed herein are directed to session continuity between SDN-controlled and non-SDN-controlled wireless networks. The concepts and technologies disclosed herein leverage a connection-less native IP-based protocol to manage device mobility and session continuity within a type of RAN and/or across different RAN technologies. This is possible due to SDN technology and thanks to collaboration between autonomous devices and networks. Future services, however, will need to be supported on many different types of networks that utilize different management control systems, including networks that do not support SDN. Accordingly, the concepts and technologies disclosed herein extend SDN-based management solutions to support interworking with non-SDN based networks and roaming scenarios with session continuity.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

Figure 1:
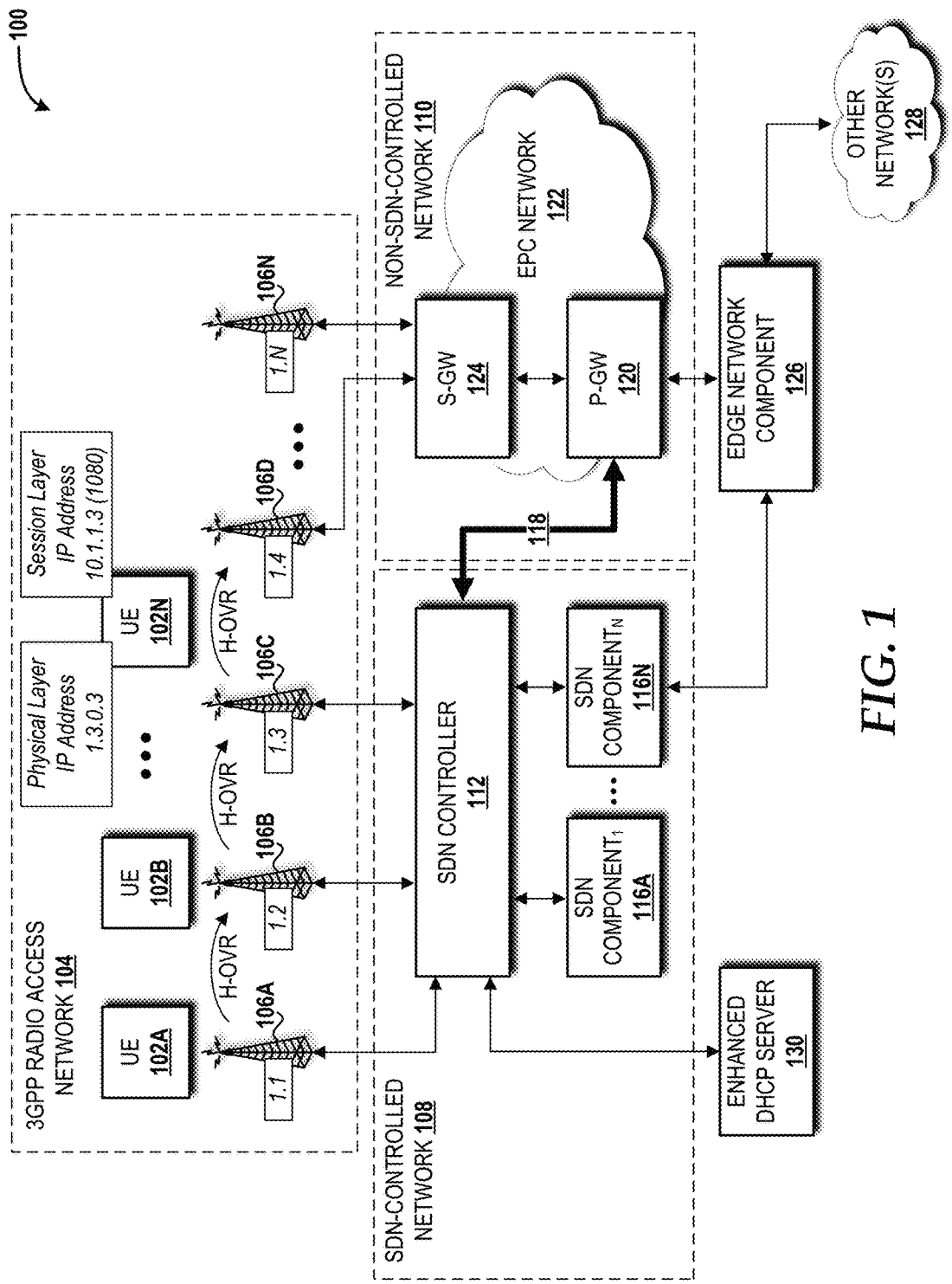
FIG. 1 is a block diagram illustrating an operating environment in which aspects of the concepts and technologies disclosed herein can be implemented.

Turning now to FIG. 1, a block diagram illustrating an operating environment 100 in which aspects of the concepts and technologies disclosed herein can be implemented will be described. The operating environment 100 includes a plurality of user equipment ("UE") devices 102A-102N (referred to herein collectively a "UEs 102," or singularly as "UE 102"). The UEs 102 are currently operating in communication with a 3GPP RAN 104. The UE 102 can be a cellular phone, a feature phone, a smartphone, a mobile computing device, a tablet computing device, a portable television, a portable video game console, or the like capable of communicating with the 3GPP RAN 104.

The 3GPP RAN 104 can include one or more service areas (also referred to herein as "cells") having the same or different cell sizes. The 3GPP RAN 104 can operate in accordance with one or more RATs that utilize mobile telecommunications standards including, but not limited to, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other current 3GPP cellular technologies, other future 3GPP cellular technologies, combinations thereof, and/or the like. The 3GPP RAN 104 can utilize various channel access methods (which may or may not be used by the aforementioned standards), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like to provide a radio/air interface to the UEs 102. Data communications can be provided in part by the 3GPP RAN 104 using GPRS, Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, the 3GPP RAN 104 may be a GSM RAN ("GRAN"), a GSM EDGE RAN ("GERAN"), a UMTS Terrestrial Radio Access Network ("UTRAN"), an evolved U-TRAN ("E-UTRAN"), any combination thereof, and/or the like. The concepts and technologies disclosed herein will, at times, be described in context of the 3GPP RAN 104 operating in accordance with LTE specifications, although those skilled in the art will appreciate the applicability of the concepts and technologies disclosed herein to other cellular technologies, including, in particular, those captured within future generation 3GPP standards. For purposes of this disclosure, the 3GPP RAN 104 will be described as being an E-UTRAN. This embodiment should not be construed as being limiting in any way. Moreover, in some embodiments, the 3GPP RAN 104 is or includes one or more virtual RANs ("vRANs") designed to operate in accordance with 3GPP specifications.

In some embodiments, one or more of the UEs 102 is an IoT or M2M device. As an IoT device, the UE(s) 102 can be or can include any "thing" that is configured to be network addressable so as to connect to and communicate with one or more networks, such as the 3GPP RAN 104 and other networks described herein, over which to communicate with other connected devices, including, for example, computers, smartphones, tablets, vehicles, other IoT/M2M devices, servers, other networks, the Internet, combinations thereof, and the like. Moreover, the UE(s) 102 embodied as an IoT device can be deployed for consumer use, business use, and can find application in many industry-specific use cases. For example, the UE(s) 102 embodied as an IoT device may find at least partial application in the following industries: automotive; energy; healthcare; industrial; retail; and smart buildings/homes. Those skilled in the art will appreciate the applicability of IoT-solutions to other industries as well as consumer and business use cases. For this reason, applications of the UE(s) 102 embodied as an IoT device described herein are used merely to illustrate some example applications of IoT devices, and therefore should not be construed as being limiting in any way. It should be understood that the UE(s) 102 can be a mobile device capable of movement through the 3GPP RAN or a stationary device, although the concepts will be described with particular reference to the UE(s) 102 being mobile within the 3GPP RAN 104 and across other non-3GPP access networks (see FIG. 4).

The UE(s) 102 can communicate with the 3GPP RAN 104 by way of one or more base stations 106A-106N. As used herein, a "base station" refers to a radio receiver and/or transmitter (collectively, transceiver) that is/are configured to provide a radio/air interface over which one or more devices, such as the UEs 102, can connect to a network, such as the 3GPP RAN 104. Accordingly, a base station is intended to encompass one or more base transceiver stations ("BTSs"), one or more NodeBs, one or more eNodeBs ("eNBs"), and/or other networking nodes or combinations thereof that are capable of providing a radio/air interface for the 3GPP RAN 104 regardless of the technologies utilized to do so. A base station can be in communication with one or more antennas (not shown), each of which may be configured in accordance with any antenna design specifications to provide a physical interface for receiving and transmitting radio waves to and from one or more devices, such as the UE 102. Although only five base stations are shown, the 3GPP RAN 104 can support any number of base stations, including base stations that operate in accordance with multiple RATs. The illustrated base stations 106A-106N will be described in the context of providing the radio/air interface for an E-UTRAN, and as such, will be described as eNBs.

The base stations 106A, 106B, 106C of the 3GPP RAN 104 are shown as being in communication with and being controlled by an SDN-controlled network 108. The base stations 106D, 106N of the 3GPP RAN 104 are shown as being in communication with and being controlled by a non-SDN-controlled network 110. The SDN-controlled network 108 is a network implemented in accordance with SDN concepts. SDN is an architectural framework for creating intelligent networks that are programmable, application-aware, and more open. SDN provides an agile and cost-effective communications platform for handling the dramatic increase in data traffic on carrier networks by providing a high degree of scalability, security, and flexibility. SDN provides several benefits. SDNs can allow for the creation of multiple, virtual network control planes on common hardware. SDN can help extend service virtualization and software control into many existing network elements. SDN enables applications to request and manipulate services provided by the network and allow the network to expose network states back to the applications. SDN exposes network capabilities through application programming interfaces ("APIs"), making the control of network equipment remotely accessible and modifiable via third-party software clients, using open protocols such as OpenFlow, available from Open Network Forum ("ONF"). 3GPP and other standards bodies and industry forums are currently working to standardize SDN for use in multiple aspects of future mobile telecommunications networks under 5G standards. An illustrative network functions virtualization platform ("NFVP") upon which the SDN concepts described herein can be implemented is described herein below with reference to FIG. 10.

The illustrated SDN-controlled network 108 includes an SDN controller 112. The SDN controller 112 can, on-demand, allocate wireless spectrum resources to the base stations 106A-106C operating in the 3GPP RAN 104. The SDN controller 112 can be configured to support any access networks, such as the 3GPP RAN 104, through a connectionless-based native IP protocol interface. The SDN controller 112 also can manage mobility of devices, such as the illustrated UEs 102, during handover ("H-OVR") between the base stations 106A-106C served by the SDN-controlled network 108, and mobility of the UEs 102 between the base stations 106A-106C and the base stations 106D-106N served by the non-SDN controlled network 110. The SDN controller 112 also can manage session continuity for the UE 102 as communications are handed over between base stations served by the SDN-controlled network 108 and base stations served by the non-SDN-controlled network 110.

In the illustrated SDN-controlled network 108, the SDN controller 112 is in communication with a plurality of SDN components 116A-116N (referred to herein collectively as SDN components 116, or in the singular form as SDN component 116). The SDN components 116 can include one or more routers, one or more switches, one or more gateways, or some combination thereof. In some embodiments, the SDN components 116 utilize OpenFlow protocols and function as OpenFlow switches or OpenFlow routers, although the concepts and technologies disclosed herein are not limited to OpenFlow protocols. In some embodiments, the SDN components 116 provide, at least in part, an SDN evolved packet core ("EPC") network. An EPC network provides core network functions in accordance with 3GPP standards specifications. Accordingly, an EPC network can include one or more mobility management entity ("MMEs"), one or more serving gateways ("S-GWs"), one or more packet data network gateways ("P-GWs"), one or more combination SGW/PGWs, one or more home subscriber servers ("HSSs"), one or more policy and charging rules functions ("PCRFs"), one or more DIAMETER routing agents ("DRAs"), one or more DIAMETER edge agents ("DEAs"), or any combination thereof.

The SDN controller 112 also is in communication with the non-SDN-controlled network 110 via an interface 118. In particular, the SDN controller 112 is in communication with an EPC network 122 via a P-GW 120. The EPC network 122 of the non-SDN-controlled network 110 also includes an S-GW 124. The EPC network 122 can include other EPC network components such as described herein.

When the UE 102 moves from being managed by the SDN-controlled network 108 to being managed by the non-SDN-controlled network 110 (e.g., after H-OVER from the base station 106C to the base station 106D), the interface 118 can be used to establish one or more tunnels (e.g., GTP tunnels) through which data associated with an active session that is to be carried out on the legacy infrastructure of the non-SDN-controlled network 110 can be shared. Tunneling via the interface 118 can be used to exchange UE handover information and the session address assigned to the UE 102 for a given session. When the UE 102 instead moves from being managed by the non-SDN-controlled network 110 to the SDN-controlled network 108, no tunnel is needed.

The SDN components 116 can include one or more SDN MMEs. The EPC network 122 also can include one or more MMEs. An MME (or SDN MME) can be configured in accordance with 3GPP standards specifications. An MME, in general, can perform operations to control signaling traffic related to mobility and security for access to the 3GPP RAN 104.

The SDN components 116 can include one or more SDN S-GWs. The EPC network 122 also can include one or more S-GWs, such as the S-GW 124 in the illustrated example. Whether the S-GW 124 or an SDN S-GW, an S-GW can be configured in accordance with 3GPP standards specifications. An S-GW (or SDN S-GW) provides a point of interconnect between the radio-side (e.g., the 3GPP RAN 104) and an EPC network, such as an SDN EPC network created by the SDN components 116 or the EPC network 122 of the non-SDN-controlled network 110. An S-GW serves the UEs 102 by routing incoming and outgoing IP packets.

The SDN components 116 can include one or more SDN P-GWs. The EPC network 122 also can include one or more P-GWs, such as the P-GW 120 in the illustrated example. Whether the P-GW 120 or an SDN P-GW, a P-GW can be configured in accordance with 3GPP standards specifications. A P-GW (or SDN P-GW) also interconnects an EPC network, such as an SDN EPC network created by the SDN components 116 or the EPC network 122 of the non-SDN-controlled network 110, and one or more external IP networks, such as, for example, one or more other networks, including other public land mobile networks ("PLMNs"), PDNs, circuit-switched networks, and the like. A P-GW routes IP packets to and from other network(s). A PGW also performs operations such as IP address/IP prefix allocation, policy control, and charging.

In the illustrated example, the P-GW 120 and one of the SDN components 116 operating as an SDN P-GW are in communication with an edge network component 126, which provides access to/from one or more other networks 128, such as the Internet. The edge network component 126 can be implemented, for example, as a switch, router, or other network component. In some embodiments, the edge network component 126 utilizes OpenFlow protocol and functions as an OpenFlow switch or OpenFlow router, although the concepts and technologies disclosed herein are not limited to OpenFlow protocols. In some implementations, a P-GW and an S-GW are deployed as independent network components, and in other implementations as a combined network component offering functionality of both a P-GW and an S-GW.

The SDN components 116 can include one or more HSSs. The EPC network 122 also can include one or more HSSs (not shown). An HSS (or SDN HSS) can be configured in accordance with 3GPP standards specifications. An HSS is a database that contains user-related information for users of devices, such as the UE 102. An HSS can provide support functions to one or more MMEs for mobility management, call and session setup, user authentication, and access authorization.

The SDN components 116 can include one or more PCRFs. The EPC network 122 also can include one or more PCRFs (not shown). A PCRF (or SDN PCRF) can be configured in accordance with 3GPP standards specifications. A PCRF can determine policy rules, detect service data flows, enforce policies, and perform flow-based charging.

The SDN components 116 can include one or more DRAs. The EPC network 122 also can include one or more DRAs (not shown). A DRA (or SDN DRA) can be configured in accordance with 3GPP standards specifications. A DRA is a functional element in a 3G or 4G (e.g., LTE) network that provides real-time routing capabilities to ensure that messages are routed among the correct elements within a network. DRAs were introduced by the 3GPP to address the increased DIAMETER signaling traffic and growing complexity of 4G LTE networks. A DRA can provide real-time routing capabilities to ensure that DIAMETER signaling messages are routed to the correct resources in an EPC network.

The SDN components 116 can include one or more DEAs. The EPC network 122 also can include one or more DEAs (not shown). A DEA (or SDN DEA) can be configured in accordance with 3GPP standards specifications. A DEA provides a point of contact into and out of an EPC core network at the DIAMETER application level. A DEA provides secure communications to connect an EPC network to the other network(s) to facilitate internetwork signaling operations (e.g., roaming, charging, and billing), for example, between home and visited PLMN. A DEA can enable DIAMETER signaling traffic to flow core networks while also disguising the topology of the core networks to one another.

The SDN controller 112 also is in communication with an enhanced dynamic host configuration protocol ("DHCP") server 130. DHCP protocol is well-known and as such additional details regarding DHCP architecture and procedures are not described in further detail herein. The enhanced DHCP server 130 distributes and updates IP addresses and other configuration information for the SDN-controlled network 108 for distribution to the 3GPP RAN 104 via the SDN controller 112.

Each of the base stations 106 is associated with an IP address interface pre-fix, as shown in a rectangle next to the corresponding component. The IP address interface pre-fix utilized herein establishes a physical layer IP address interface pre-fix for every base station, non-3GPP access point (e.g., trusted or untrusted WI-FI access point), and other air interface component, and is broadcast over the air. For example, the base station 106A is associated with an IP address interface pre-fix of 1.1 and broadcasts this IP address interface pre-fix to one or more of the UEs 102 operating within a cell served by the base station 106A (also referred to herein as "cell A"); the base station 106B is associated with an IP address interface pre-fix of 1.2 and broadcasts this IP address interface pre-fix to one or more of the UEs 102 operating within a cell served by the base station 106B (also referred to herein as "cell B"); the base station 106C is associated with an IP address interface pre-fix of 1.3 and broadcasts this IP address interface pre-fix to one or more UEs 102 operating within a cell served by the base station 106C (also referred to herein as "cell C"); the base station 106D is associated with an IP address interface pre-fix of 1.4 and broadcasts this IP address interface pre-fix to one or more UEs 102 operating within a cell served by the base station 106D (also referred to herein as "cell D"); and the base station 106N is associated with an IP address interface pre-fix of 1.N and broadcasts this IP address interface pre-fix to one or more of the UEs 102 operating within a cell served by the base station 106N (also referred to herein as "cell N"). Each of the UEs 102 also has a physical address, such as a media access control ("MAC") address. The combination of the IP address interface pre-fix broadcast by the cell site and the physical address of a UE 102 can form an IPv6 address. Each of the UEs 102 has a global unique interface IP address when it is attached to a cellular site or another access point. This IP address is used by the SDN controller 112 for mobility management.

A session layer address is also used herein. A session layer address is a service address provided at the device application layer. A session layer address can be a service IP address, or a combination of a service IP, a service port number (e.g., port 1080 in the illustrated example), and a service protocol. Session layer addresses can be assigned by the serving network, either by a foreign agent, from a service IP address pool maintained by the SDN controller 112, or via the enhanced DCHCP server 130. Regardless of which address assignment methodology is used for session layer address management, the session layer address is static and will not change when a device changes the point of attachment, such as the UE 102 during handover from cell C, controlled by the SDN-controlled network 108, to cell D, controlled by the non-SDN-controlled network 110, in the illustrated example.

A session layer address tuple assigned to the UE 102 by a network entity (i.e., a foreign agent, the SDN controller 112, or the enhanced DHCP server 130) can be based on information provided by the UE 102 in an address assignment request procedure. The tuple assigned can be just an IP address or a special combination of an IP address, a port number, and an application protocol ID. A UE 102 can have one or more session address tuples for different application needs. This concept effectively replaces the concepts of APNs, PDP contexts, and PDN connections in some cellular networks.

In the illustrated example, the UE 102A is shown being served by or camping on the base station 106A ("cell A"). The UE 102B is shown being served by or camping on the base station 106B ("cell B"). The UE 102N is shown moving away from the base station 106C ("cell C") towards the base station 106D ("cell D"). An example of the UE 102N attaching to the base station 106C and moving from the base station 106C towards the base station 106D while session continuity is maintained between the SDN-controlled network 108 and the non-SDN-controlled network 110 will now be described.

After the UE 102N powers on and camps on cell C served by the base station 106C, the UE 102N learns its physical layer IP address (e.g., 1.3.0.3 in the illustrated example) by combining its physical address with the IP address interface pre-fix broadcast by the base station 106C. The UE 102N then initiates an attachment procedure to the 3GPP RAN 104 by generating an attach request and sending the attach request to the base station 106C. In response, the base station 106C forwards an attach request to the SDN controller 112, which performs AAA procedures for authentication and authorization.

After the SDN controller 112 accepts the attachment procedure for the UE 102N, the SDN controller 112 updates the SDN components 116, the edge network component 126, and any other components on how to reach the physical layer IP address of the UE 102N, and then informs the UE 102N of the success (or failure) of the attachment procedure. The SDN controller 112 also can provide an address for one or more preferred DHCP servers, such as the enhanced DHCP server 130.

After a successful attachment procedure, the UE 102N can start a DHCP procedure to obtain a session address tuple. In this procedure, the UE 102N can use the DHCP server addresses stored on a subscriber identity module ("SIM") card (best shown in FIG. 5) of the UE 102, stored on memory (also best shown in FIG. 8) of the UE 102, or obtained from the SDN controller 112 during the attachment procedure. The UE 102 can then send a DHCP address tuple assignment request to a preferred DHCP server, such as the enhanced DHCP server 130 in the illustrated example. The UE 102 can include additional application-related characteristics in the DHCP address tuple assignment request so that the enhanced DCHP server 130 can assign a proper session IP address, the port range, and the application ID range to the UE 102N. The DHCP address tuple assignment request can use the UE's physical layer IP address.

After the enhanced DHCP server 130 responds to the DHCP address tuple assignment request and the UE 102N is configured with a session layer IP address, the UE 102N can inform the SDN controller 112 of the association between the session layer IP address and the physical layer IP address. In response, the SDN controller 112 updates the SDN components 116, the edge network component 126, and/or other network components on how to reach the session layer IP address through the physical layer IP address. As the UE 102N moves between the base stations 106 (i.e., H-OVR), the UE 102N learns a new physical layer IP address, and during a registration update procedure, the UE 102N can update the association between the session layer IP address and the new physical layer IP address. The SDN controller 112 can then update the SDN components 116, the edge network component 126, and/or other network components on how to reach the UE 102 via the new physical layer IP address as well as how to reach the session layer IP address through the new physical layer IP address.

In the illustrated example, the UE 102N is served by the base station 106C ("cell C"), which has an IP interface pre-fix of 1.3. The UE 102N has a physical layer IP address of 1.3.0.3 and a session layer IP address of 10.1.1.3. When the UE 102N moves out of the SDN-controlled network 108 domain (cell C) and enters the non-SDN-controlled network 110 domain (cell D), the SDN controller 112 informs the P-GW 120 over the interface 118 of the UE handover to cell D and the UE's 102N current session layer IP address of 10.1.1.3. The UE 102N follows the same PDN connectivity request procedure to establish a default EPS bearer and requests a new IP address. If an operator desires to implement session continuity across non-SDN-controlled domain (i.e., P-GW controlled) and SDN-controlled domains, and because the P-GW 120 already knows the UE 102N was served by the SDN domain and already has a session IP address 10.1.1.3, no new IP address will be assigned to this the UE's 102N request. Packets destined for the UE 102N can now be forwarded via the P-GW 120. This can be done through the SDN controller 112 configuration or via information maintained by the edge network component 126.

When the UE 102N moves out of the non-SDN-controlled network 110 domain and enters the SDN-controlled network 108 domain, the P-GW 120 informs the SDN controller 112 that the UE 102N has been handed over to the SDN-controlled network 108. The UE 102N can now auto-derive the physical IP address associated with cell C, as described above and shown in the illustrated example. The UE 102N sends a request for session IP address to the network. Since the SDN controller 112 already knows the UE 102N was served by the P-GW 120 and the cellular IP address (served as session address) was assigned, no new session IP address will be assigned and the old session IP address of the UE 102N will remain unchanged, such that session continuity is maintained. Moreover, the SDN controller 112 can notify the enhanced DHCP server 130 for the UE session IP address to avoid any future conflict. Packets destined for the UE 102N can now be forwarded to the UE 102N via the SDN component(s) 116.

Figure 2A:
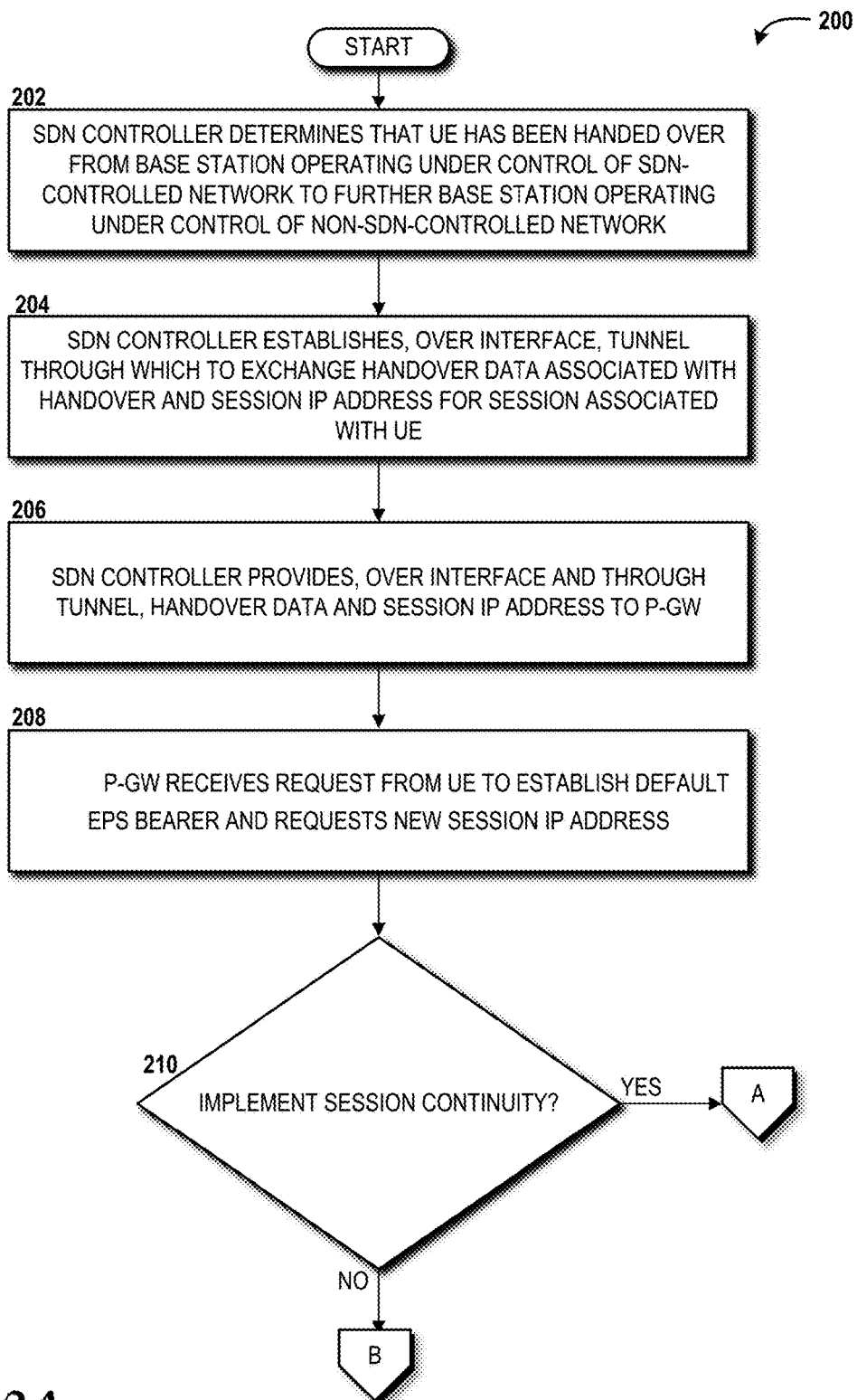
FIGS. 2A-2B are flow diagrams illustrating a method for maintaining session continuity between an SDN-controlled network and a non-SDN controlled network, according to an illustrative embodiment.
Figure 2B:
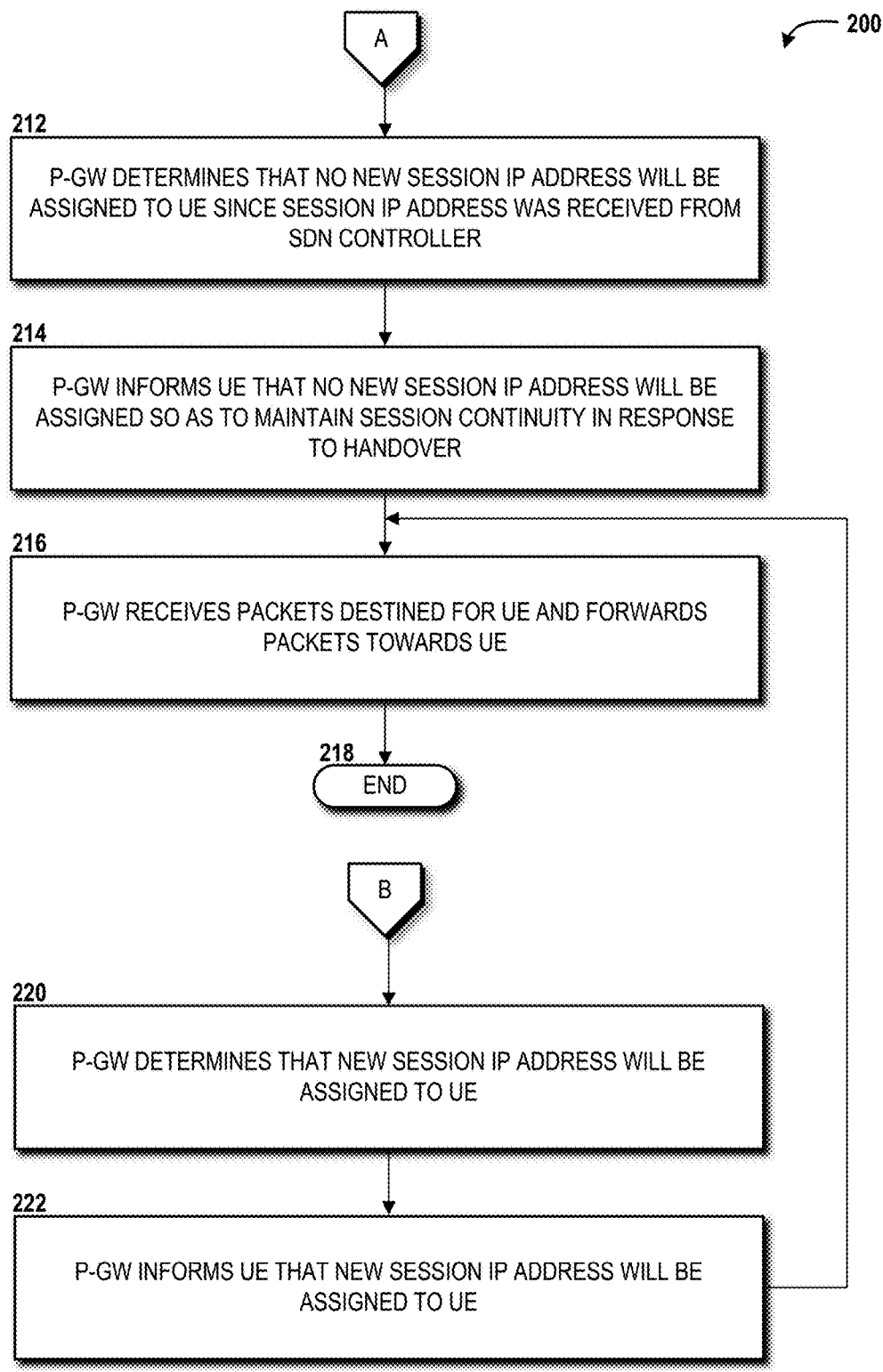

Turning now to FIGS. 2A and 2B, aspects of a method 200 for maintaining session continuity between the SDN-controlled network 108 and the non-SDN controlled network 110 will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the illustrated methods can be ended at any time and need not be performed in their entirety. Some or all operations of the methods, and/or substantially equivalent operations, can be performed by execution of computer-executable instructions included on a computer-readable storage media, as defined below. The term "computer-executable instructions," and variants thereof, as used in the description and claims, is used expansively herein to include routines, application programs, software, application modules, program modules, components, data structures, algorithms, and the like. Computer-executable instructions can be implemented on various system configurations, including single-processor or multiprocessor systems, distributed computing systems, minicomputers, mainframe computers, personal computers, hand-held computing devices, microprocessor-based, programmable consumer electronics, network nodes, combinations thereof, and the like.

Thus, it should be appreciated that the logical operations described herein may be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

The method 200 will be described with reference to FIG. 2 and further reference to FIG. 1. Moreover, the operations of the method 200 and the other methods disclosed herein will be described as being performed by the UE 102, one or more of the base stations 106, the SDN controller 112, one or more of the SDN components 116, the P-GW 120, the S-GW 124, the edge network component 126, the enhanced DHCP server 130, or some combination thereof. These operations can be performed via execution, by one or more processors, of one or more software program modules or applications.

The method 200 begins and proceeds to operation 202, where the SDN controller 112 determines that the UE 102 has been handed over from a base station operating under control of the SDN-controlled network 108 (e.g., the base station 106C in the example shown in FIG. 1) to a further base station operating under control of the non-SDN network 110 (e.g., the base station 106D in the example shown in FIG. 1). From operation 202, the method 200 proceeds to operation 204, where the SDN controller 112 establishes, over the interface 118, a tunnel through which to exchange handover data associated with the handover from the base station to the further base station and a session IP address for a session associated with the UE 102.

From operation 204, the method 200 proceeds to operation 206, where the SDN controller 112 provides, over the interface 118 and through the tunnel, the handover data and the session IP address to the P-GW 120. From operation 206, the method 200 proceeds to operation 208, where the P-GW 120 receives a request from the UE 102 to establish a default EPS bearer and requests a new session IP address. From operation 208, the method 200 proceeds to operation 210, where the P-GW 120 determines whether to implement session continuity in accordance with an operator's specifications.

If the P-GW 120 determines, at operation 210, based upon the operator's specifications, to implement session continuity, the method 200 proceeds to operation 212 (shown in FIG. 2B), where the P-GW 120 determines that no new session IP address will be assigned to the UE 102 since a session IP address was received from the SDN controller 112 via the interface 118. From operation 212, the method 200 proceeds to operation 214, where the P-GW 120 informs the UE 102 that no new session IP address will be assigned so as to maintain session continuity for the UE 102 in response to the handover. From operation 214, the method 200 proceeds to operation 216, where the P-GW 120 receives packets destined for the UE 102 and forwards the packets towards the UE 102. In some embodiments, the P-GW 120 forwards the packets towards the UE 102 based, at least in part, upon information maintained by the edge network component 126. In some other embodiments, the P-GW 120 forwards the packets towards the UE 102 based, at least in part, upon information maintained by the SDN controller 112. From operation 216, the method 200 proceeds to operation 218, where the method 200 ends.

Returning to FIG. 2A, and particularly, to operation 210, if the P-GW 120 determines, based upon the operator's specifications, not to implement session continuity, the method 200 proceeds to operation 220, where the P-GW 120 determines that a new session IP address will be assigned to the UE 102. From operation 220, the method 200 proceeds to operation 222, where the P-GW 120 informs the UE 102 that the new session IP address will be assigned to the UE 102. From operation 222, the method 200 proceeds to operation 216, where the P-GW 120 receives packets destined for the UE 102 and forwards the packets towards the UE 102. In some embodiments, the P-GW 120 forwards the packets towards the UE 102 based, at least in part, upon information maintained by the edge network component 126. In some other embodiments, the P-GW 120 forwards the packets towards the UE 102 based, at least in part, upon information maintained by the SDN controller 112. From operation 216, the method 200 proceeds to operation 218, where the method 200 ends.

Figure 3:
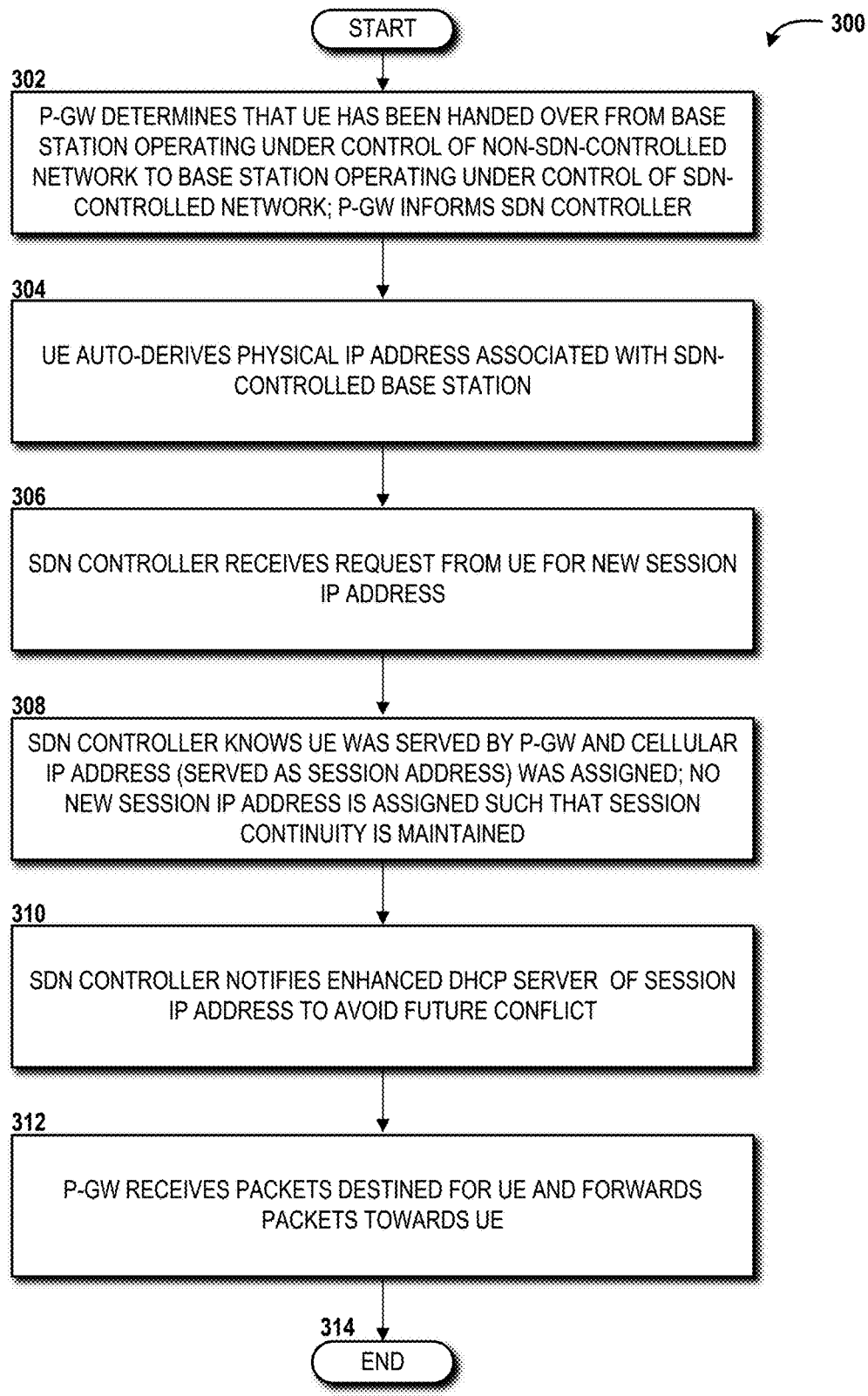
FIG. 3 is a flow diagram illustrating a method for maintaining session continuity between a non-SDN-controlled network and an SDN-controlled network, according to an illustrative embodiment.

Turning now to FIG. 3, aspects of a method 300 for maintaining session continuity between the non-SDN-controlled network 110 and the SDN-controlled network 108 will be described, according to an illustrative embodiment. The method 300 begins and proceeds to operation 302, where the P-GW 120 determines that the UE 102 has been handed over from a base station operating under control of the non-SDN-controlled network 110 (e.g., the base station 106D in the example shown in FIG. 1) to a further base station operating under control of the SDN-controlled network 108 (e.g., the base station 106C in the example shown in FIG. 1). From operation 302, the method 300 proceeds to operation 304, where the UE 102 auto-derives a physical layer IP address associated with the SDN-controlled base station (i.e., the base station 106C in the example shown in FIG. 1). From operation 304, the method 300 proceeds to operation 306, where the SDN controller 112 receives a request from the UE 102 for a new session IP address.

From operation 306, the method 300 proceeds to operation 308, where the SDN controller 112 knows that the UE 102 was served by the P-GW 120 and the cellular IP address (served as a session address) was assigned to the UE 102. The SDN controller 112 determines that no new session IP address is to be assigned such that session continuity is maintained. From operation 308, the method 300 proceeds to operation 310, where the SDN controller 112 notifies the enhanced DHCP server 130 of the session IP address to avoid future conflict. From operation 310, the method 300 proceeds to operation 312, where the P-GW 120 receives packets destined for the UE 102 and forwards the packets towards the UE 102. In some embodiments, the P-GW 120 forwards the packets towards the UE 102 based, at least in part, upon information maintained by the edge network component 126. In some other embodiments, the P-GW 120 forwards the packets towards the UE 102 based, at least in part, upon information maintained by the SDN controller 112. From operation 312, the method 300 proceeds to operation 314, where the method 300 ends.

Figure 4:
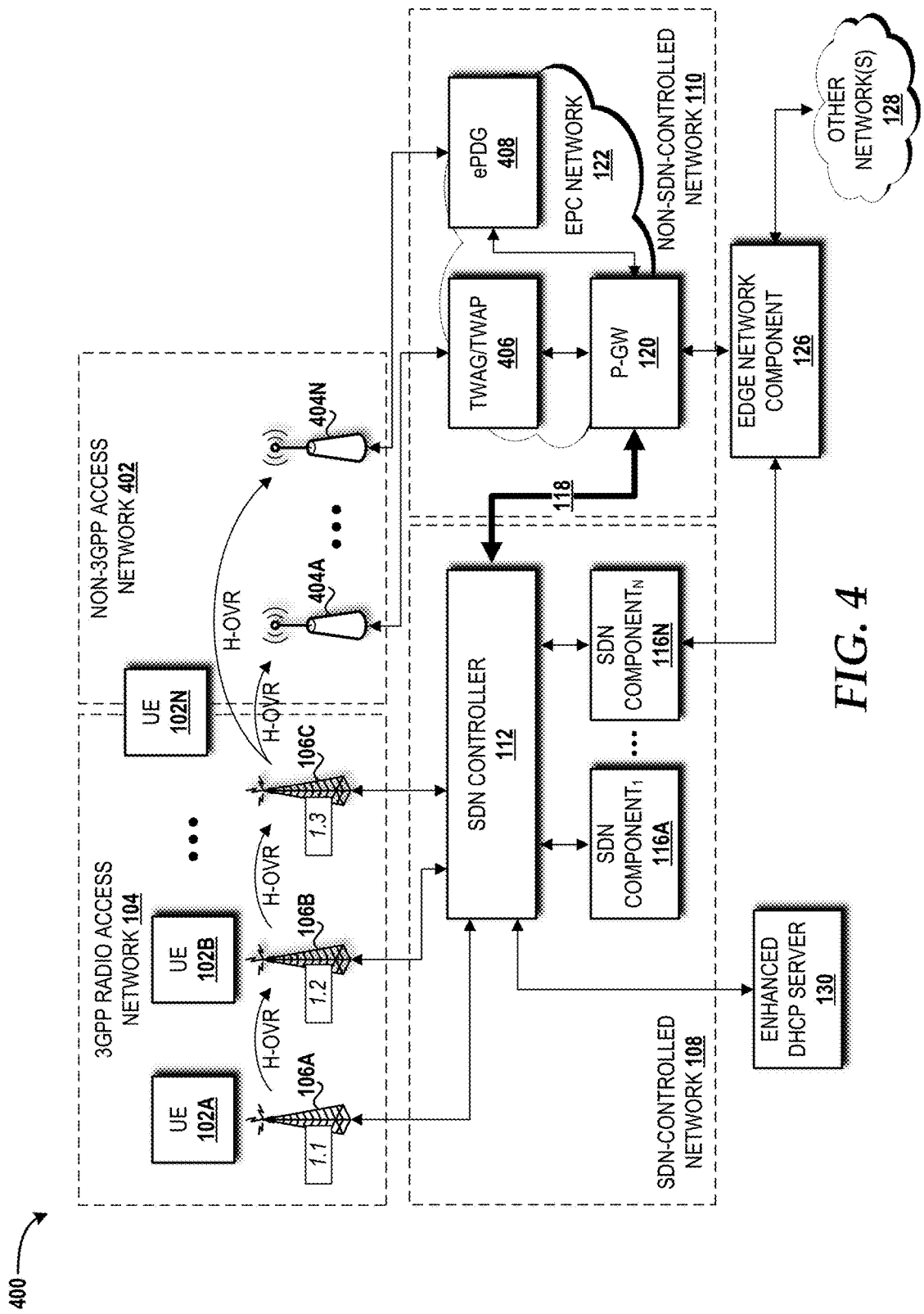
FIG. 4 is a block diagram illustrating another operating environment in which aspects of the concepts and technologies disclosed herein can be implemented.

Turning now to FIG. 4, a block diagram illustrating another operating environment 400 in which other aspects of the concepts and technologies disclosed herein can be implemented will be described. The operating environment 400 includes the plurality of UEs 102, the 3GPP RAN 104, the base stations 106, the SDN-controlled network 108, the non-SDN-controlled network 110, the SDN controller 112, the SDN components 116, the interface 118, and the P-GW 120 introduced above with reference to the operating environment 100 shown in FIG. 1.

The illustrated operating environment 400 also includes a non-3GPP access network 402. The non-3GPP access network 402 includes a plurality of wireless access points ("APs") 404A-404N. The non-3GPP access network 402 and the wireless APs 404A-404N can operate in accordance with one or more Institute of Electrical and Electronic Engineers ("IEEE") 802.11 standards, such as, for example, IEEE 802.11a, 802.11b, 802.11g, 802.11n, 802.1ac and/or future 802.11 standards (referred to herein collectively as "WI-FI"). Draft 802.11 standards are also contemplated. A WI-FI network may be implemented utilizing one or more of the wireless APs 404A-404N embodied as one or more wireless WI-FI APs. In some implementations, the UE 102 connects to a WI-FI network via one or more secure connections, each of which may utilize an encryption technology, such as, but not limited to, WI-FI Protected Access ("WPA"), WPA2, Wired Equivalent Privacy ("WEP"), and/or the like. Moreover, a WI-FI network can provide a connection to the Internet or other WAN so that the UE 102 can access Internet content, such as, for example, websites, streaming media, online video games, downloadable content, and the like.

The non-SDN controlled network 110 in the operating environment 400 also includes the EPC network 122 modified to incorporate network functions to support access by the UEs 102 via trusted and non-trusted 3GPP access networks. The illustrated non-3GPP access network 402 includes the wireless AP 404A operating as an access point to a trusted non-3GPP access network, and the wireless AP 404N operating as an access point to an untrusted non-3GPP access network. In particular, the wireless AP 404A is in communication with the non-SDN-controlled network 110 via a trusted WLAN access gateway/proxy ("TWAG/TWAP") 406, which interfaces with the P-GW 120 in the EPC network 122. The TWAG/TWAP 406 provides the UEs 102 trusted access to the EPC network 122 via a connection to the P-GW 120 through a secure tunnel utilized GTP or other tunneling protocols. The wireless AP 404N is in communication with an evolved packet data gateway ("ePDG") 408, which also interfaces with the P-GW 120 to provide the UEs 102 access to the EPC network 122 from untrusted non-3GPP access networks. The ePDG 408 functions as a security gateway to provide network security and interworking control via IPSec tunnel establishment based upon information obtained during 3GPP AAA procedures.

In the illustrated example, the UE 102N moves from the 3GPP RAN 104 to the non-3GPP access network 402 (e.g., the base station 106C to the wireless AP 404A or to the wireless AP 404N). In response, the SDN controller 112 informs the P-GW 120 that the UE 102N has been handed over to the non-3GPP access network 402, and additionally, specifies whether the UE 102N is connected via a trusted connection (e.g., the wireless AP 404A) or via an untrusted connection (e.g., the wireless AP 404N). The UE 102N receives a WI-FI IP address from a service provider of the non-3GPP access network 402. The UE 102 sends a request to access services provided by the non-SDN-controlled network 110. The TWAG/TWAP 406, in response to the request, performs AAA procedures. A GTP tunnel is created between the TWAG/TWAP 406 and the P-GW 120 for each session via the wireless AP 404. Upon successful authentication, the TWAG/TWAP 406 informs the P-GW 120 about the UE 102N request for service and an IP address request. Since the P-GW 120 knows the UE 102N was served by the SDN domain and already has an session IP address assigned to it, no new IP address will be assigned and the old session IP address of the UE 102N will remain unchanged so that session continuity is maintained.

When the UE 102N moves from the non-3GPP access network 402 to the 3GPP RAN 104 (e.g., from the wireless AP 404A or the wireless AP 404N to the base station 106C), the P-GW 120 informs the SDN controller 112 that the UE 102N being handed over out of the non-SDN-controlled network 110. The UE 102N, in response, constructs a physical layer interface IP address based upon the IP address interface pre-fix of the base station 106 to which the UE 102N is handed over (e.g., the base station 106C in the illustrated example) and the UE's 102N built-in address as described herein above. The UE 102N then sends a request for session IP address also as described above. Since the SDN controller 112 already knows that the UE 102N was served by the P-GW 120 and the session IP address was assigned, no new session IP address will be assigned and the old session IP address of the UE will remain unchanged so that session continuity is maintained. For the ongoing session, packets are forwarded to the new domain with SDN GW and traffic will flow the logical path.

Figure 5:
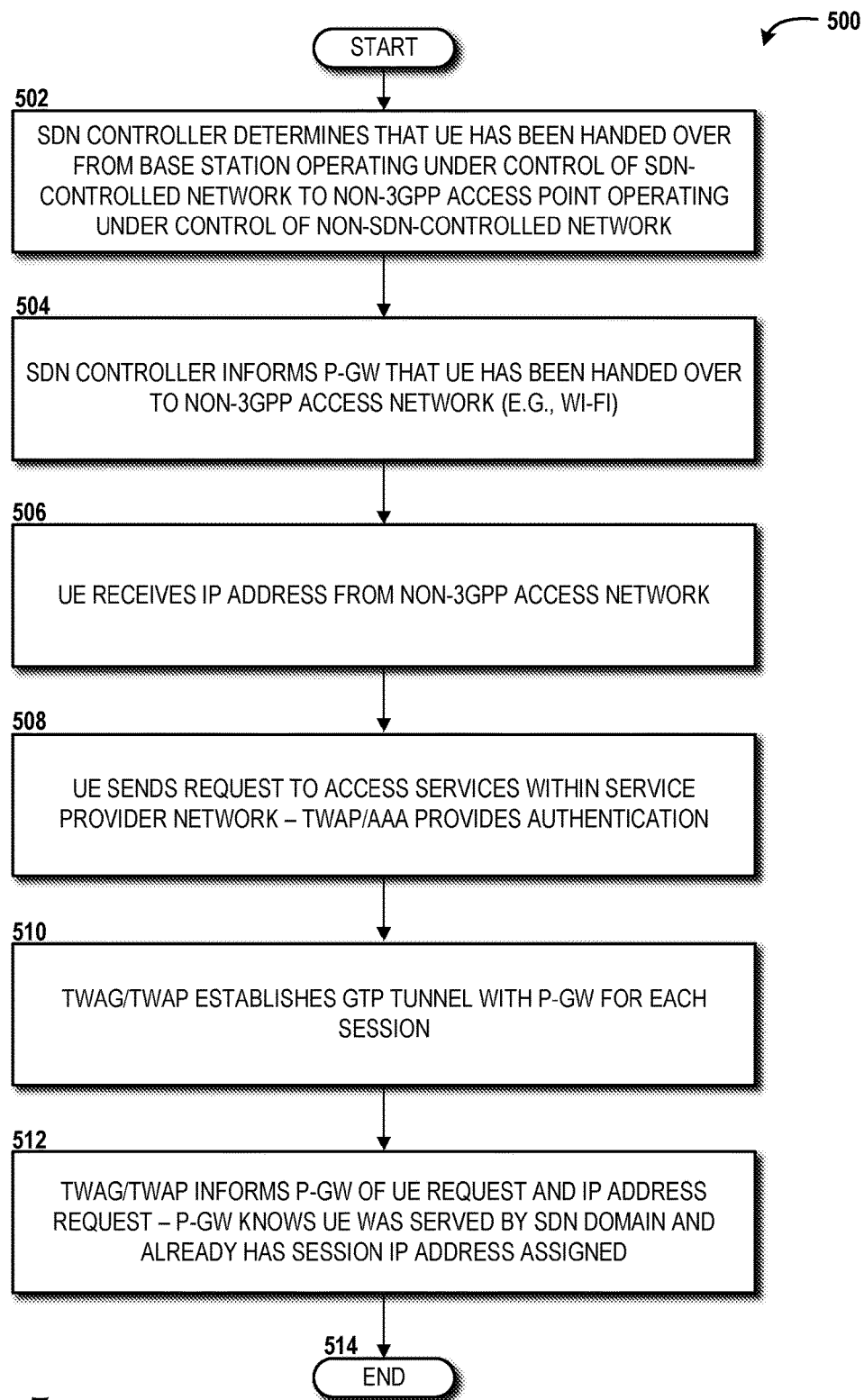
FIG. 5 is a flow diagram illustrating a method for maintaining session continuity between an SDN-controlled network serving a 3GPP RAN and a non-SDN-controlled network serving a non-3GPP access network, according to an illustrative embodiment.

Turning now to FIG. 5, aspects of a method 500 for maintaining session continuity between the SDN-controlled network 108 serving the 3GPP RAN 104 and the non-SDN-controlled network 110 serving the non-3GPP access network 402 will be described, according to an illustrative embodiment. The method 500 will be described with reference to FIG. 5 and additional reference to FIG. 4.

The method 500 begins and proceeds to operation 502, where the SDN controller 112 determines that the UE 102N has been handed over from the base station 106C operating under control of the SDN-controlled network 108 to the wireless AP 404A or 404N operating under control of the non-SDN-controlled network 110. From operation 502, the method 500 proceeds to operation 504, where the SDN controller 112 informs the P-GW 120 that the UE 102 has been handed over to the non-3GPP access network 402. From operation 504, the method 500 proceeds to operation 506, where the UE 102N receives an IP address from the non-3GPP access network 402.

From operation 506, the method 500 proceeds to operation 508, where the UE 102N sends a request to the non-SDN-controlled network 110 to access services. Also at operation 508, the TWAG/TWAP 406 performs authentication via 3GPP AAA procedures. From operation 508, the method 500 proceeds to operation 510, where the TWAG/TWAP 406 establishes a GTP tunnel with the P-GW 120 for each session. From operation 510, the method 500 proceeds to operation 512, where the TWAG/TWAP 406 informs the P-GW 120 of the UE's 102N request and IP address request. The P-GW 120 knows that the UE 102N was served by the SDN domain and already has a session IP address assigned. From operation 512, the method 500 proceeds to operation 514, where the method 500 ends.

Figure 6:
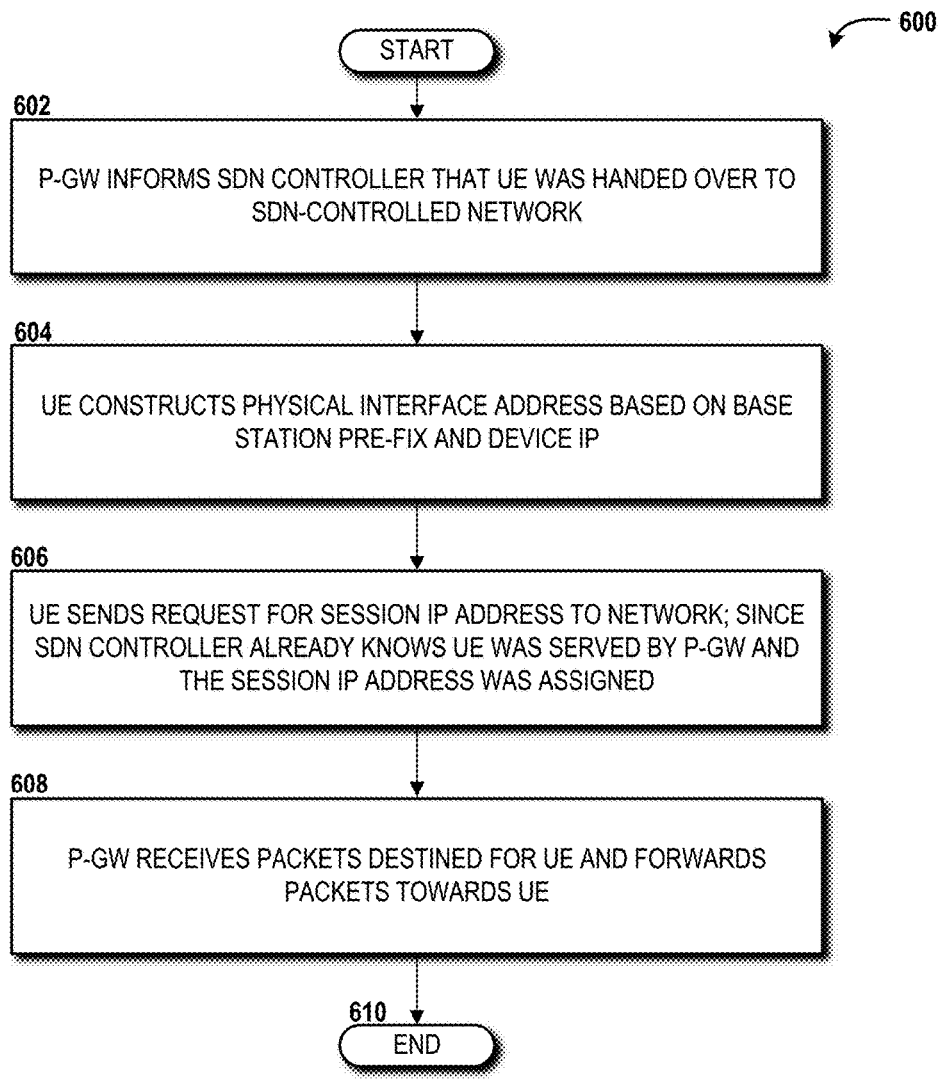
FIG. 6 is a flow diagram illustrating a method for maintaining session continuity between a non-SDN-controlled network serving a non-3GPP access network and an SDN-controlled network serving a 3GPP RAN, according to an illustrative embodiment.

Turning now to FIG. 6, aspects of a method 600 for maintaining session continuity between the non-SDN-controlled network 110 serving the non-3GPP access network 402 and the SDN-controlled network 108 serving the 3GPP RAN 104 will be described, according to an illustrative embodiment. The method 600 will be described with reference to FIG. 6 and additional reference to FIG. 4.

The method 600 begins and proceeds to operation 602, where the P-GW 120 informs the SDN controller 112 that the UE 102N was handed over to the SDN-controlled network 108. From operation 602, the method 600 proceeds to operation 604, where the UE 102 constructs a physical interface address based upon the IP interface pre-fix and the device IP address. From operation 604, the method 600 proceeds to operation 606, where the UE 102N sends a request for session IP address to the network. The SDN controller 112 already knows that the UE 102N was served by the P-GW 120 and the session IP address was already assigned. From operation 606, the method 600 proceeds to operation 608, where the P-GW 120 receives packets destined for the UE 102 and forwards the packets towards the UE 102. From operation 608, the method 600 proceeds to operation 610, where the method 600 ends.

Figure 7:
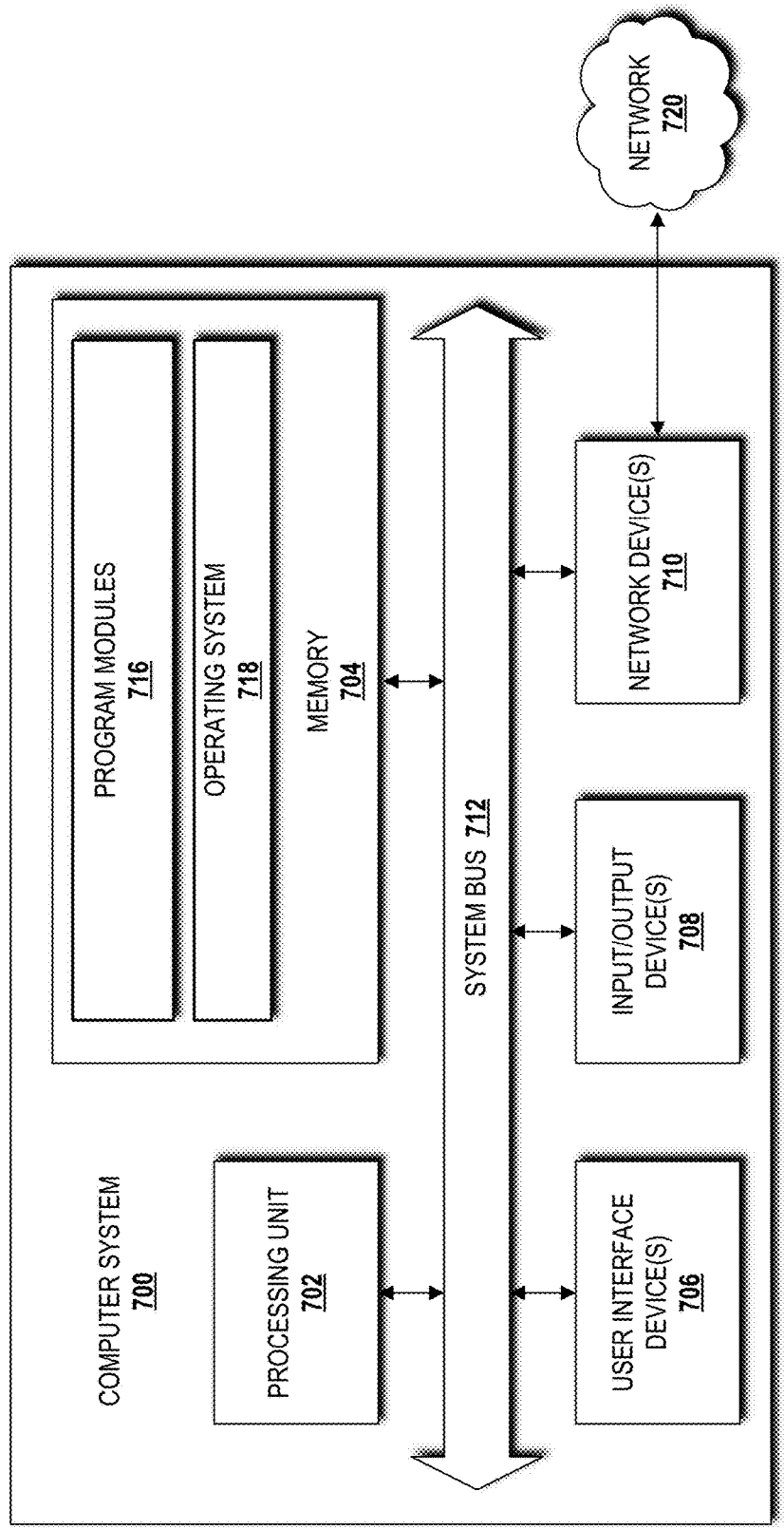
FIG. 7 is a block diagram illustrating an example computer system capable of implementing aspects of the embodiments presented herein.

Turning now to FIG. 7, a block diagram illustrating a computer system 700 configured to provide the functionality in accordance with various embodiments of the concepts and technologies disclosed herein will be described. The systems, devices, and other components disclosed herein, such as, for example, the UEs 102, the base stations 106, the SDN controller 112, the SDN components 116, the P-GW 120, the EPC network 122 components, the S-GW 124, the edge network component 126, the enhanced DHCP server 130, and/or any other components disclosed herein, or any combination thereof, can utilize or can execute upon, at least in part, an architecture that is the same as or at least similar to the architecture of the computer system 700. It should be understood, however, that modification to the architecture may be made to facilitate certain interactions among elements described herein.

The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 704 communicates with the processing unit 702 via the system bus 712. In some embodiments, the memory 704 is operatively connected to a memory controller (not shown) that enables communication with the processing unit 702 via the system bus 712. The illustrated memory 704 includes an operating system 718 and one or more program modules 716. The operating system 718 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 716 may include various software and/or program modules to perform the various operations described herein. The program modules 716 and/or other programs can be embodied in computer-readable media containing instructions that, when executed by the processing unit 702, perform various operations such as those described herein. According to embodiments, the program modules 716 may be embodied in hardware, software, firmware, or any combination thereof.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, PDAs, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer. In some embodiments, the I/O devices 708 can be used for manual controls for operations to exercise under certain emergency situations.

The network devices 710 enable the computer system 700 to communicate with other networks or remote systems via a network 720. Examples of the network devices 710 include, but are not limited to, a modem, a radio frequency ("RF") or infrared ("IR") transceiver, a telephonic interface, a bridge, a router, or a network card. The network 720 may be or may include a wireless network such as, but not limited to, a WLAN, a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 720 may be or may include a wired network such as, but not limited to, a Wide Area Network ("WAN"), a wired Personal Area Network ("PAN"), or a wired Metropolitan Area Network ("MAN"). The network 720 can be or can include any of the networks described herein, such as the 3GPP RAN 104, the SDN-controlled network 108, the non-SDN-controlled network 110, the EPC network 122, the non-3GPP access network 402, other networks, and/or any combination thereof.

Figure 8:
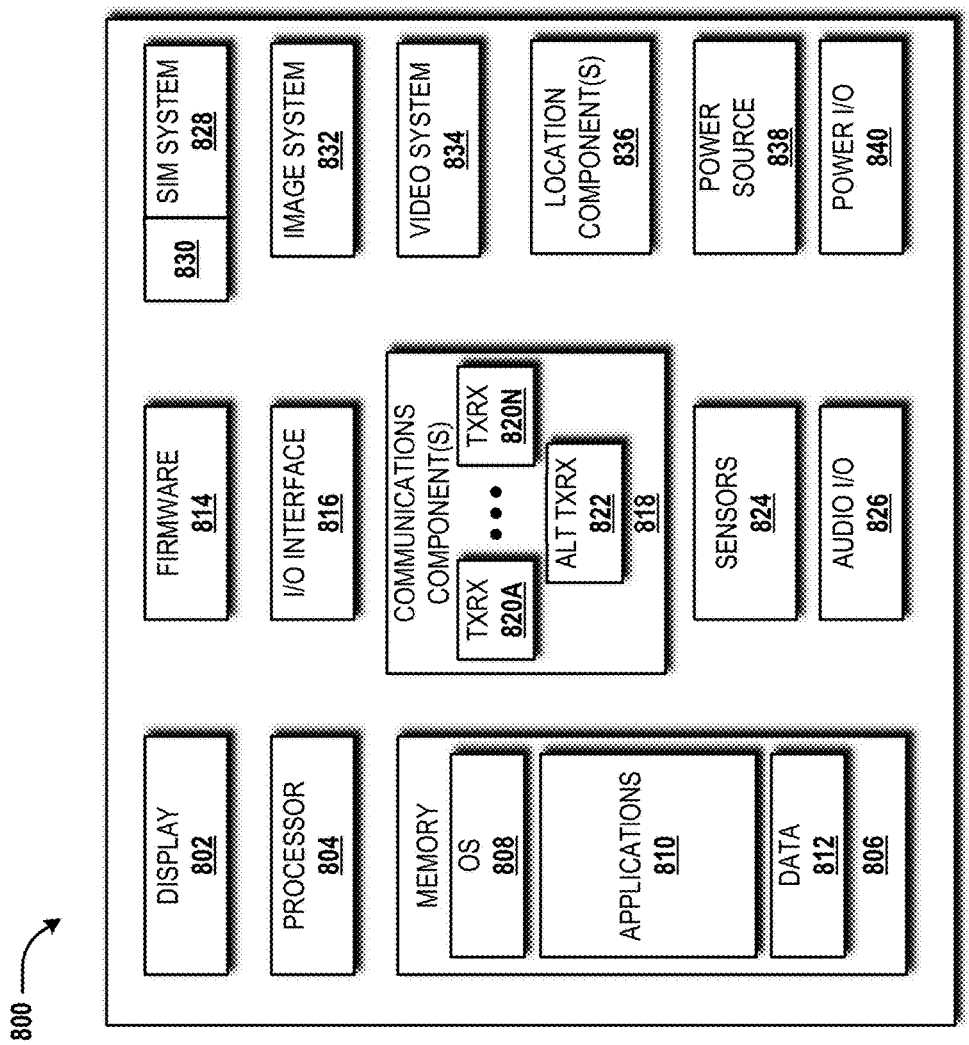
FIG. 8 is a block diagram illustrating an example mobile device capable of implementing aspects of the embodiments disclosed herein.

Turning now to FIG. 8, a block diagram illustrating an example mobile device 800, according to an illustrative embodiment will be described. In some embodiments, one or more of the UEs 102 (shown in FIG. 1) can be configured like the mobile device 800. While connections are not shown between the various components illustrated in FIG. 8, it should be understood that some, none, or all of the components illustrated in FIG. 8 can be configured to interact with one other to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 800 also can include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808, one or more applications 810, other computer-executable instructions stored in a memory 806, or the like. In some embodiments, the applications 810 also can include a user interface ("UP") application (not illustrated in FIG. 8).

The UI application can interface with the operating system 808 to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in entering content, viewing account information, answering/initiating calls, entering/deleting data, entering and setting user IDs and passwords for device access, configuring settings, manipulating address book content and/or settings, multimode interaction, interacting with other applications 810, and otherwise facilitating user interaction with the operating system 808, the applications 810, and/or other types or instances of data 812 that can be stored at the mobile device 800. The data 812 can include, for example, one or more identifiers, and/or other applications or program modules. According to various embodiments, the data 812 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 810, the data 812, and/or portions thereof can be stored in the memory 806 and/or in a firmware 814, and can be executed by the processor 804. The firmware 814 also can store code for execution during device power up and power down operations. It can be appreciated that the firmware 814 can be stored in a volatile or non-volatile data storage device including, but not limited to, the memory 806 and/or a portion thereof.

The mobile device 800 also can include an input/output ("I/O") interface 816. The I/O interface 816 can be configured to support the input/output of data such as location information, user information, organization information, presence status information, user IDs, passwords, and application initiation (start-up) requests. In some embodiments, the I/O interface 816 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ10 port, a proprietary port, combinations thereof, or the like. In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments one or more of the transceivers of the communications component 818 may be configured to communicate using GSM, CDMA ONE, CDMA2000, LTE, and various other 2G, 2.5G, 3G, 4G, 5G, and greater generation technology standards, such as those described herein above as the RATs and the ad-hoc RATs. Moreover, the communications component 818 may facilitate communications over various channel access methods (which may or may not be used by the aforementioned standards) including, but not limited to, TDMA, FDMA, W-CDMA, Orthogonal Frequency-Division Multiplexing ("OFDM"), Space-Division Multiple Access ("SDMA"), and the like.

In addition, the communications component 818 may facilitate data communications GPRS, EDGE, the HSPA protocol family including HSDPA, EUL or otherwise termed HSUPA, HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-820N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, orientation sensors, noise sensors, proximity sensors, or the like. As such, it should be understood that the sensors 824 can include, but are not limited to, accelerometers, magnetometers, gyroscopes, infrared sensors, noise sensors, microphones, combinations thereof, or the like. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to an MMS message, email message, and sent to another mobile device. The video and/or photo content also can be shared with other devices via various types of data transfers via wired and/or wireless communication devices as described herein.

The mobile device 800 also can include one or more location components 838. The location components 836 can be configured to send and/or receive signals to determine a geographic location of the mobile device 800. According to various embodiments, the location components 836 can send and/or receive signals from global positioning system ("GPS") devices, assisted GPS ("A-GPS") devices, WI-FI/WIMAX and/or cellular network triangulation data, combinations thereof, and the like. The location component 836 also can be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

Figure 9:
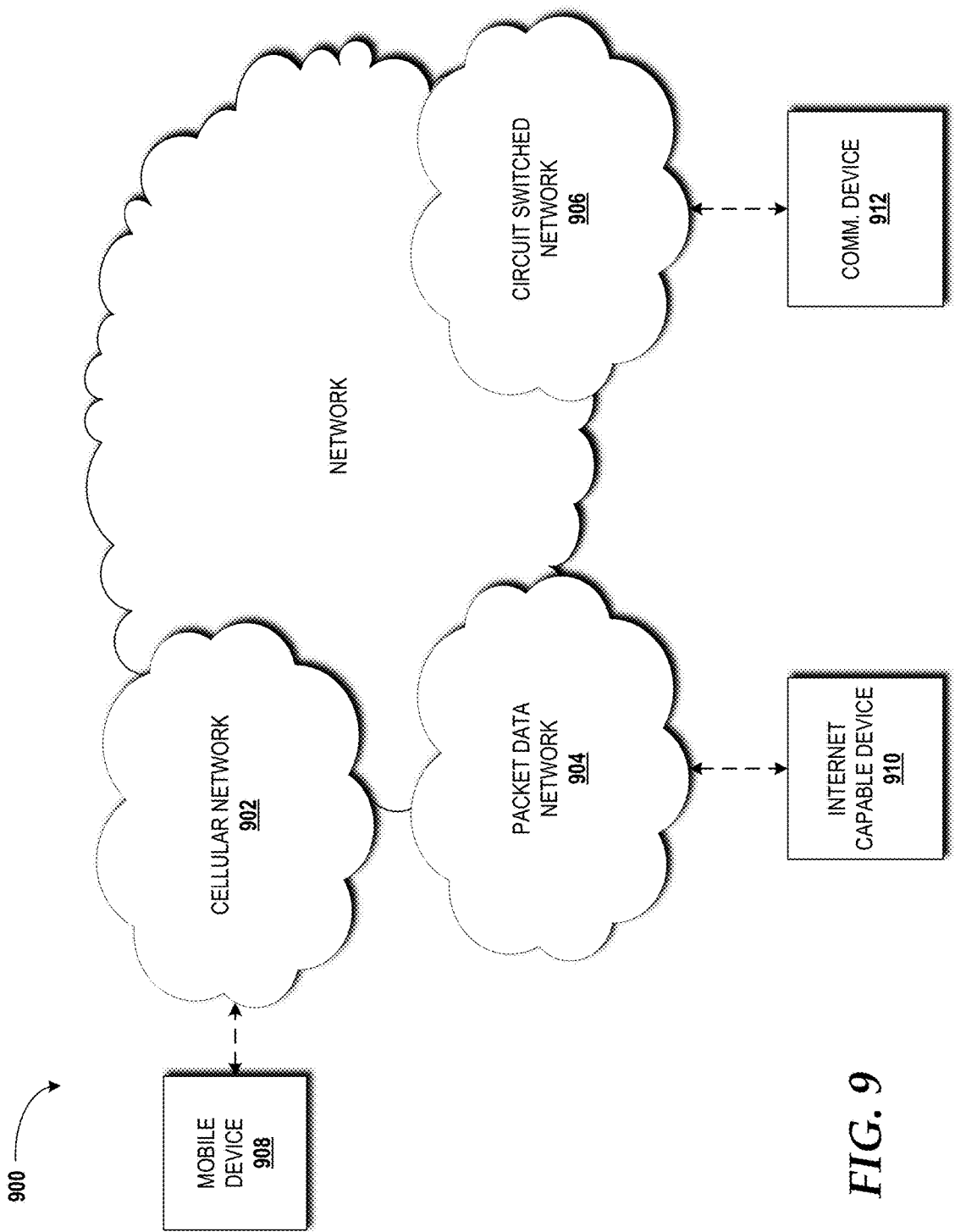
FIG. 9 is a block diagram schematically illustrating a network, according to an illustrative embodiment.

Turning now to FIG. 9, a schematic illustration of a network 900 will be described, according to an illustrative embodiment. The network 900 includes a cellular network 902, a packet data network 904, for example, the Internet, and a circuit switched network 906, for example, a publicly switched telephone network ("PSTN"). The cellular network 902 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 902 also includes radios and nodes for receiving and transmitting voice, data, and combinations thereof to and from radio transceivers, networks, the packet data network 904, and the circuit switched network 906.

A mobile communications device 908, such as, for example, a cellular telephone, the UE 102, a mobile terminal, a PDA, a laptop computer, a handheld computer, and combinations thereof, can be operatively connected to the cellular network 902. The cellular network 902 can be configured as a 2G GSM network and can provide data communications via GPRS and/or EDGE. Additionally, or alternatively, the cellular network 902 can be configured as a 3G UMTS network and can provide data communications via the HSPA protocol family, for example, HSDPA, EUL (also referred to as HSUPA), and HSPA+. The cellular network 902 also is compatible with 4G mobile communications standards as well as evolved and future mobile standards.

The packet data network 904 includes various devices, for example, servers, computers, databases, and other devices in communication with one another, as is generally known. The packet data network 904 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 904 includes or is in communication with the Internet. The circuit switched network 906 includes various hardware and software for providing circuit switched communications. The circuit switched network 906 may include, or may be, what is often referred to as a plain old telephone system ("POTS"). The functionality of a circuit switched network 906 or other circuit-switched network are generally known and will not be described herein in detail.

The illustrated cellular network 902 is shown in communication with the packet data network 904 and a circuit switched network 906, though it should be appreciated that this is not necessarily the case. One or more Internet-capable devices 910, for example, a PC, a laptop, a portable device, or another suitable device, can communicate with one or more cellular networks 902, and devices connected thereto, through the packet data network 904. It also should be appreciated that the Internet-capable device 910 can communicate with the packet data network 904 through the circuit switched network 906, the cellular network 902, and/or via other networks (not illustrated).

As illustrated, a communications device 912, for example, a telephone, facsimile machine, modem, computer, or the like, can be in communication with the circuit switched network 906, and therethrough to the packet data network 904 and/or the cellular network 902. It should be appreciated that the communications device 912 can be an Internet-capable device, and can be substantially similar to the Internet-capable device 910. In the specification, the network 900 is used to refer broadly to any combination of the networks 902, 904, 906. It should be appreciated that substantially all of the functionality described with reference to the network 900 can be performed by the cellular network 902, the packet data network 904, and/or the circuit switched network 906, alone or in combination with other networks, network elements, and the like. The network 900 can include the functionality of any of the networks described herein.

Figure 10:
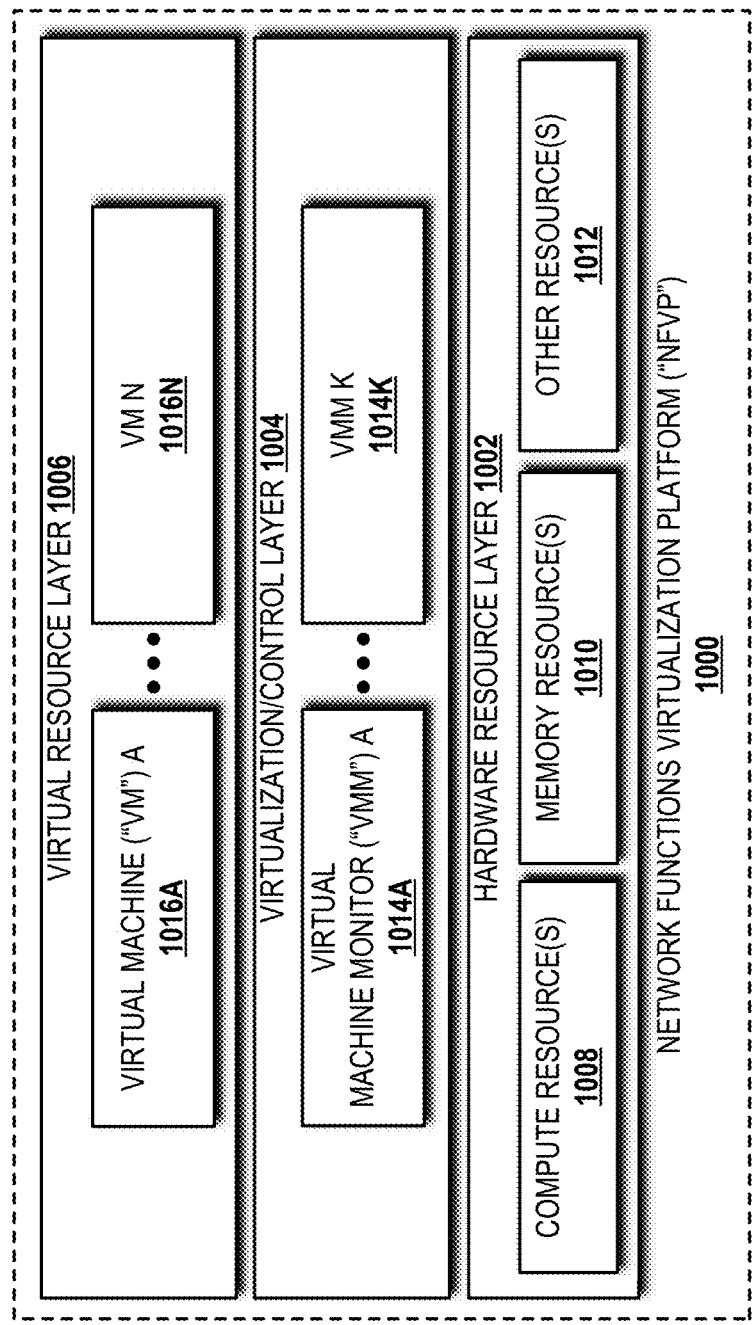
FIG. 10 is a block diagram illustrating an example network functions virtualization platform ("NFVP") capable of implementing aspects of the embodiments presented herein.

Turning now to FIG. 10, a network functions virtualization platform ("NFVP") 1000 will be described, according to an exemplary embodiment. The architecture of the NFVP 1000 can be used to implement VNFs as virtual counterparts to physical network functions disclosed herein. The NFVP 1000 can be utilized to implement, at least in part, components of the SDN-controlled network 108, the SDN controller 112 and/or the SDN components 116. The NFVP 1000 is a shared infrastructure that can support multiple services and network applications. The illustrated NFVP 1000 includes a hardware resource layer 1002, a virtualization/control layer

1004, and a virtual resource layer 1006 that work together to perform operations as will be described in detail herein.

The hardware resource layer 1002 provides hardware resources, which, in the illustrated embodiment, include one or more compute resources 1008, one or more memory resources 1010, and one or more other resources 1012. The compute resource(s) 1008 can include one or more hardware components that perform computations to process data, and/or to execute computer-executable instructions of one or more application programs, operating systems, and/or other software. The compute resources 1008 can include one or more central processing units ("CPUs") configured with one or more processing cores. The compute resources 1008 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 1008 can include one or more discrete GPUs. In some other embodiments, the compute resources 1008 can include CPU and GPU components that are configured in accordance with a co-processing CPU/GPU computing model, wherein the sequential part of an application executes on the CPU and the computationally-intensive part is accelerated by the GPU. The compute resources 1008 can include one or more system-on-chip ("SoC") components along with one or more other components, including, for example, one or more of the memory resources 1010, and/or one or more of the other resources 1012. In some embodiments, the compute resources 1008 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 1008 can be or can include one or more hardware components architected in accordance with an ARM architecture, available for license from ARM HOLDINGS of Cambridge, United Kingdom. Alternatively, the compute resources 1008 can be or can include one or more hardware components architected in accordance with an x89 architecture, such an architecture available from INTEL CORPORATION of Mountain View, Calif., and others. Those skilled in the art will appreciate the implementation of the compute resources 1008 can utilize various computation architectures, and as such, the compute resources 1008 should not be construed as being limited to any particular computation architecture or combination of computation architectures, including those explicitly disclosed herein.

The memory resource(s) 1010 can include one or more hardware components that perform storage operations, including temporary or permanent storage operations. In some embodiments, the memory resource(s) 1010 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 1008.

The other resource(s) 1012 can include any other hardware resources that can be utilized by the compute resources(s) 1008 and/or the memory resource(s) 1010 to perform operations described herein. The other resource(s) 1012 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 1002 can be virtualized by one or more virtual machine monitors ("VMMs") 1014A-1014K (also known as "hypervisors"; hereinafter "VMMs 1014") operating within the virtualization/control layer 1004 to manage one or more virtual resources that reside in the virtual resource layer 1006. The VMMs 1014 can be or can include software, firmware, and/or hardware that alone or in combination with other software, firmware, and/or hardware, manages one or more virtual resources operating within the virtual resource layer 1006.

The virtual resources operating within the virtual resource layer 1006 can include abstractions of at least a portion of the compute resources 1008, the memory resources 1010, the other resources 1012, or any combination thereof. These abstractions are referred to herein as virtual machines ("VMs"). In the illustrated embodiment, the virtual resource layer 1006 includes VMs 1016A-1016N (hereinafter "VMs 1016"). Each of the VMs 1016 can execute one or more software applications, such as, for example, software applications including instructions to implement, at least in part, one or more components of the SDN-controlled network 108, for example, the SDN controllers 112 and/or the SDN components 116.

Based on the foregoing, it should be appreciated that concepts and technologies directed to session continuity between SDN-controlled and non-SDN-controlled wireless networks have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A method comprising:
   determining, by a software-defined network ("SDN") controller operating in an SDN-controlled network, that a handover of a user equipment has occurred from a base station operating under control of the SDN-controlled network to a further base station operating under control of a non-SDN-controlled network, wherein the SDN controller controls a plurality of SDN components operating in the SDN-controlled network, wherein the SDN controller is in communication, via a direct interface, with a packet gateway operating in the non-SDN controlled network, and wherein at least one of the plurality of SDN components is in communication with an edge network component;

in response to determining that the handover of the user equipment has occurred, establishing, by the SDN controller, over the direct interface between the SDN controller operating in the SDN-controlled network and the packet gateway operating in the non-SDN-controlled network, a tunnel through which to exchange handover data associated with the handover and a session IP address for a session in which the user equipment is involved;

providing, by the SDN controller, over the direct interface and through the tunnel, the handover data and the session IP address to the packet gateway;

receiving, by the packet gateway, a request from the user equipment to establish a new session IP address; and determining, by the packet gateway, based upon a specification provided by an operator, whether to implement session continuity for the user equipment.

2. The method of claim 1, further comprising:
determining, by the packet gateway, based upon the specification provided by the operator, to implement session continuity;
determining, by the packet gateway, based upon the packet gateway determining that session continuity is to be implemented, that the new session IP address will not be assigned to the user equipment since the session IP address was received from the SDN controller over the direct interface via the tunnel; and
informing, by the packet gateway, the user equipment that the new session IP address will not be assigned to the user equipment to maintain session continuity in response to the handover.

3. The method of claim 2, further comprising:
receiving, by the packet gateway, packets destined for the user equipment; and
forwarding, by the packet gateway, the packets towards the user equipment.

4. The method of claim 3, wherein forwarding, by the packet gateway, the packets towards the user equipment comprises forwarding the packets toward the user equipment based, at least in part, upon information maintained by the edge network component.

5. The method of claim 3, wherein forwarding, by the packet gateway, the packets towards the user equipment comprises forwarding the packets toward the user equipment based, at least in part, upon information maintained by the SDN controller.

6. The method of claim 1, further comprising:
determining, by the packet gateway, based upon the specification provided by the operator, not to implement session continuity;
determining, by the packet gateway, based upon the packet gateway determining that session continuity is not to be implemented, that the new session IP address will be assigned to the user equipment; and
assigning, by the packet gateway, the new session IP address to the user equipment.

7. A system comprising:
a packet gateway that operates in a non-software-defined network ("SDN")-controlled network;
a plurality of SDN components that operate in an SDN-controlled network;
an SDN controller that operates in the SDN-controlled network and that controls the plurality of SDN components, wherein the SDN controller is in communication, via a direct interface, with the packet gateway operating in the non-SDN-controlled network, and wherein the SDN controller comprises
an SDN controller processor; and
SDN controller memory that stores instructions that, when executed by the SDN controller processor, cause the SDN controller processor to perform operations comprising
determining that a handover of a user equipment has occurred from a base station that operates under control of the SDN-controlled network to a further base station that operates under control of the non-SDN-controlled network,
in response to determining that the handover of the user equipment has occurred, establishing over the direct interface between the SDN controller operating in the SDN-controlled network and the packet gateway operating in the non-SDN-controlled network, a tunnel through which to exchange handover data associated with the handover and a session IP address for a session in which the user equipment is involved, and
providing, over the direct interface and through the tunnel, the handover data and the session IP address to the packet gateway;
wherein the packet gateway comprises
a packet gateway processor; and
packet gateway memory that stores instructions that, when executed by the packet gateway processor to perform operations comprising
receiving a request from the user equipment to establish a new session IP address, and
determining, based upon a specification provided by an operator, whether to implement session continuity for the user equipment.

8. The system of claim 7, wherein the packet gateway processor performs operations further comprising:
determining, based upon the specification provided by the operator, to implement session continuity;
determining, based upon the packet gateway determining that session continuity is to be implemented, that the new session IP address will not be assigned to the user equipment since the session IP address was received from the SDN controller over the direct interface via the tunnel; and
informing the user equipment that the new session IP address will not be assigned to the user equipment to maintain session continuity in response to the handover.

9. The system of claim 8, wherein the packet gateway processor performs operations further comprising:
receiving packets destined for the user equipment; and
forwarding the packets towards the user equipment.

10. The system of claim 9, wherein forwarding the packets towards the user equipment comprises forwarding the packets toward the user equipment based, at least in part, upon information maintained by an edge network component.

11. The system of claim 9, wherein forwarding the packets towards the user equipment comprises forwarding the packets toward the user equipment based, at least in part, upon information maintained by the SDN controller.

12. The system of claim 7, wherein the packet gateway processor performs operations further comprising:
determining, based upon the specification provided by the operator, not to implement session continuity;
determining, based upon the packet gateway determining that session continuity is not to be implemented, that the new session IP address will be assigned to the user equipment; and
assigning the new session IP address to the user equipment.

13. The system of claim 7, further comprising a WI-FI gateway comprising:
a WI-FI gateway processor; and
WI-FI gateway memory that stores instructions that, when executed by the WI-FI gateway processor to perform operations comprising
authenticating the user equipment,
establishing, over the direct interface, a further tunnel with the packet gateway for the session, and
informing, via the further tunnel, the packet gateway of the session.

14. The system of claim 7, wherein:
the packet gateway processor performs operations further comprising determining that the user equipment has been handed over from the further base station that operates under control of the non-SDN-controlled network to the base station that operates under control of the SDN-controlled network;
the SDN controller processor performs operations further comprising
determining, based upon the specification provided by the operator, to implement session continuity,
determining, based upon the specification provided by the operator, that the new session IP address will not be assigned since the user equipment was served by the packet gateway.

15. A computer-readable storage medium having instructions stored herein that, when executed by at least one processor, cause the at least one processor to perform operations comprising:
determining that a handover of a user equipment has occurred from a base station that operates under control of a software-defined network ("SDN")-controlled network to a further base station that operates under control of a non-SDN-controlled network;
in response to determining that the handover of the user equipment has occurred, establishing over a direct interface between an SDN controller operating in the SDN-controlled network and a packet gateway operating in the non-SDN-controlled network, a tunnel through which to exchange handover data associated with the handover and a session IP address for a session in which the user equipment is involved;
providing, over the direct interface and through the tunnel, the handover data and the session IP address to the packet gateway;
receiving a request from the user equipment to establish a new session IP address; and
determining, based upon a specification provided by an operator, whether to implement session continuity for the user equipment.

16. The computer-readable storage medium of claim 15, wherein the operations further comprise:
determining, based upon the specification provided by the operator, to implement session continuity;
determining, based upon the packet gateway determining that session continuity is to be implemented, that the new session IP address will not be assigned to the user equipment since the session IP address was received from the SDN controller over the direct interface via the tunnel; and
informing the user equipment that the new session IP address will not be assigned to the user equipment to maintain session continuity in response to the handover.

17. The computer-readable storage medium of claim 15, wherein the operations further comprise:
receiving packets destined for the user equipment; and
forwarding the packets towards the user equipment.

18. The computer-readable storage medium of claim 17, wherein forwarding the packets towards the user equipment comprises forwarding the packets toward the user equipment based, at least in part, upon information maintained by an edge network component.

19. The computer-readable storage medium of claim 17, wherein forwarding the packets towards the user equipment comprises forwarding the packets toward the user equipment based, at least in part, upon information maintained by the SDN controller.

20. The computer-readable storage medium of claim 15, wherein the operations further comprise:
determining, based upon the specification provided by the operator, not to implement session continuity;
determining, based upon the packet gateway determining that session continuity is not to be implemented, that the new session IP address will be assigned to the user equipment; and
assigning the new session IP address to the user equipment.

* * * * *